United States Patent [19]

Venable

[11] Patent Number: 4,458,941
[45] Date of Patent: Jul. 10, 1984

[54] TWO POSITION SEAT ASSEMBLY
[75] Inventor: Phillip G. Venable, Orion, Ill.
[73] Assignee: J. I. Case Company, Racine, Wis.
[21] Appl. No.: 300,055
[22] Filed: Sep. 8, 1981
[51] Int. Cl.³ .............................................. A47C 13/00
[52] U.S. Cl. ..................................... 297/118; 297/124; 297/357
[58] Field of Search .................. 297/92, 124, 118, 357
[56] References Cited
U.S. PATENT DOCUMENTS

| | | | |
|---|---|---|---|
| 155,231 | 9/1874 | Francis | 297/124 |
| 2,758,633 | 8/1956 | Apple | 297/124 |
| 2,882,957 | 4/1959 | Anderson | 297/124 |
| 3,650,351 | 3/1972 | Schmidt | 297/124 |
| 4,010,977 | 3/1977 | Rahman | 297/92 |
| 4,168,860 | 9/1979 | Garza et al. | 297/92 |

Primary Examiner—Francis K. Zugel
Attorney, Agent, or Firm—Dressler, Goldsmith, Shore, Sutker & Milnamow, Ltd.

[57] ABSTRACT

A two position seat assembly is disclosed for use on a material handling vehicle. The seat assembly has a seat back section which pivots to be used as a back rest or as an elevated seat for facing the rear of the vehicle. This permits the vehicle operator to face forward to operate forward mounted equipment or to face backward to operate rearward mounted equipment.

1 Claim, 7 Drawing Figures

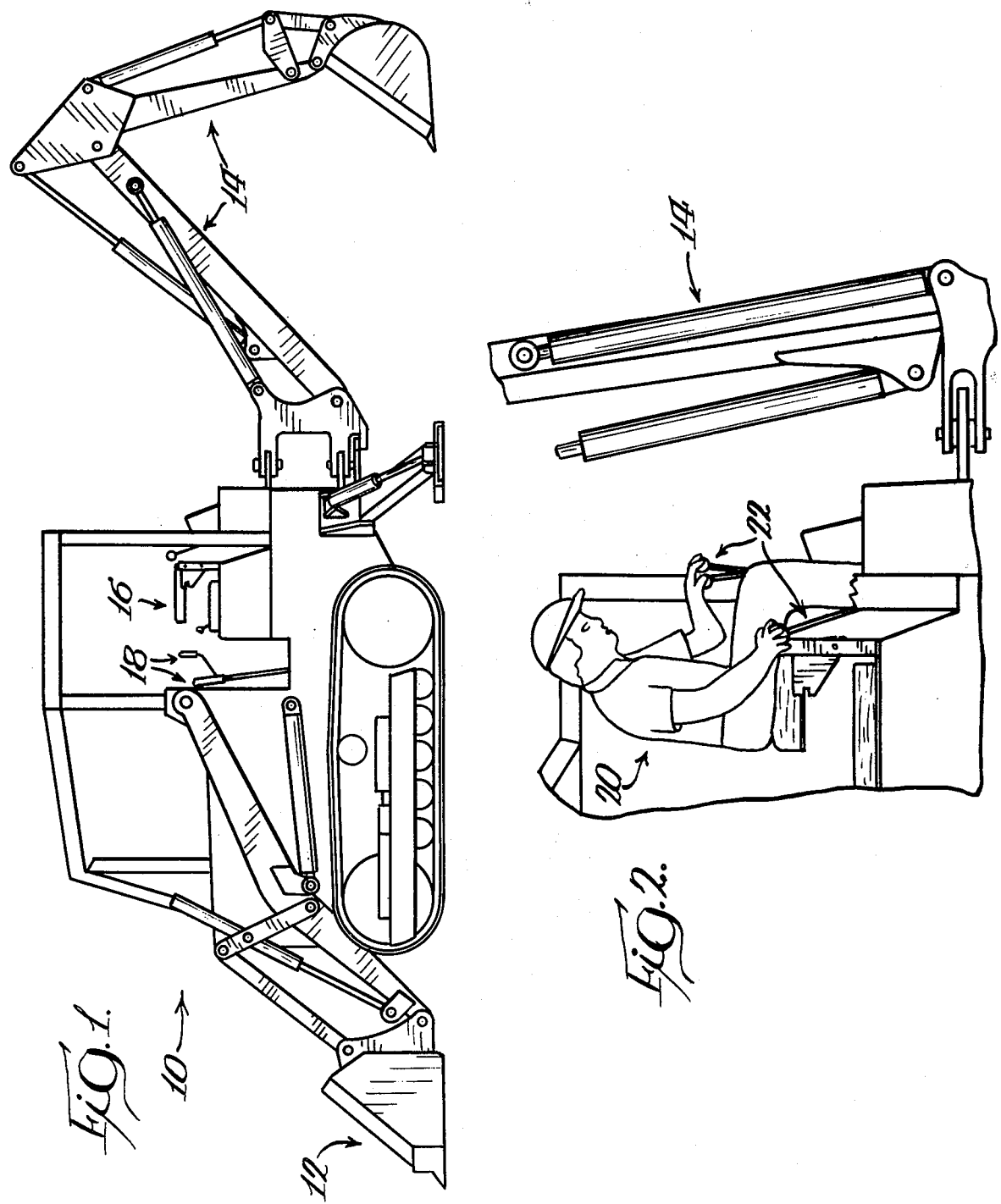

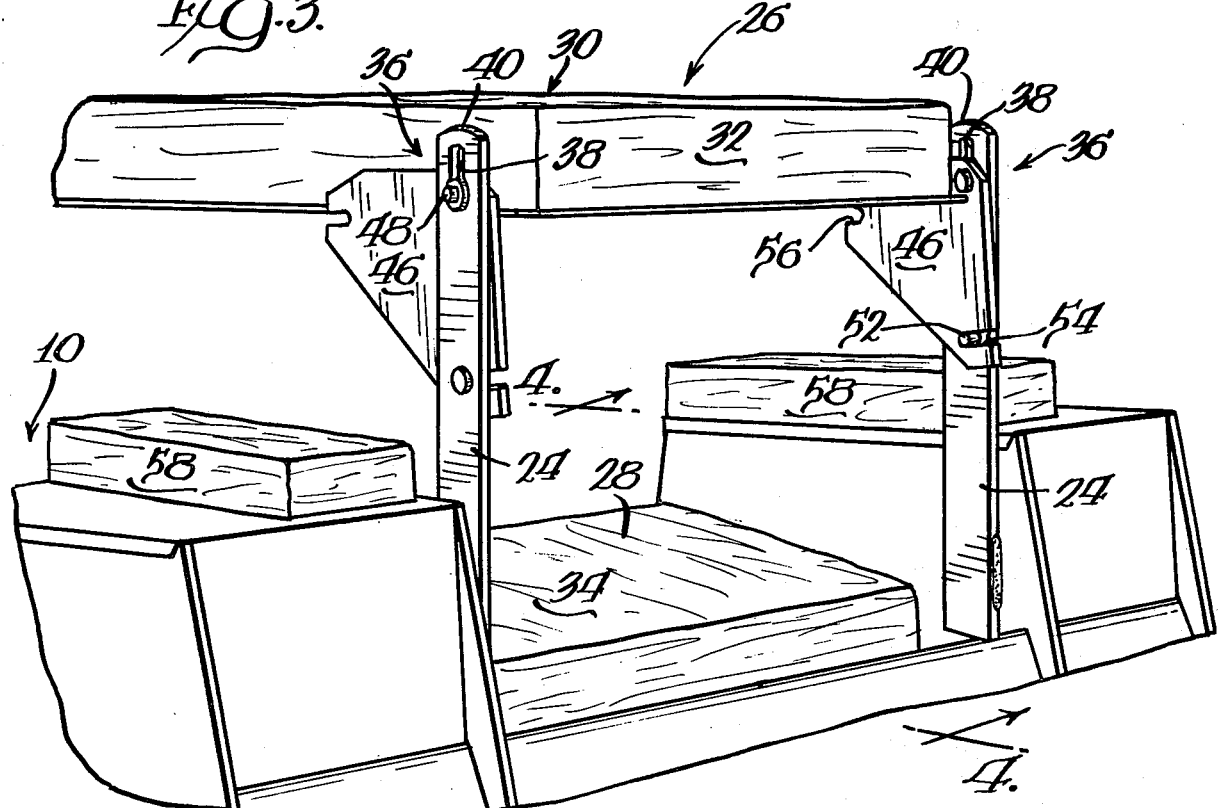
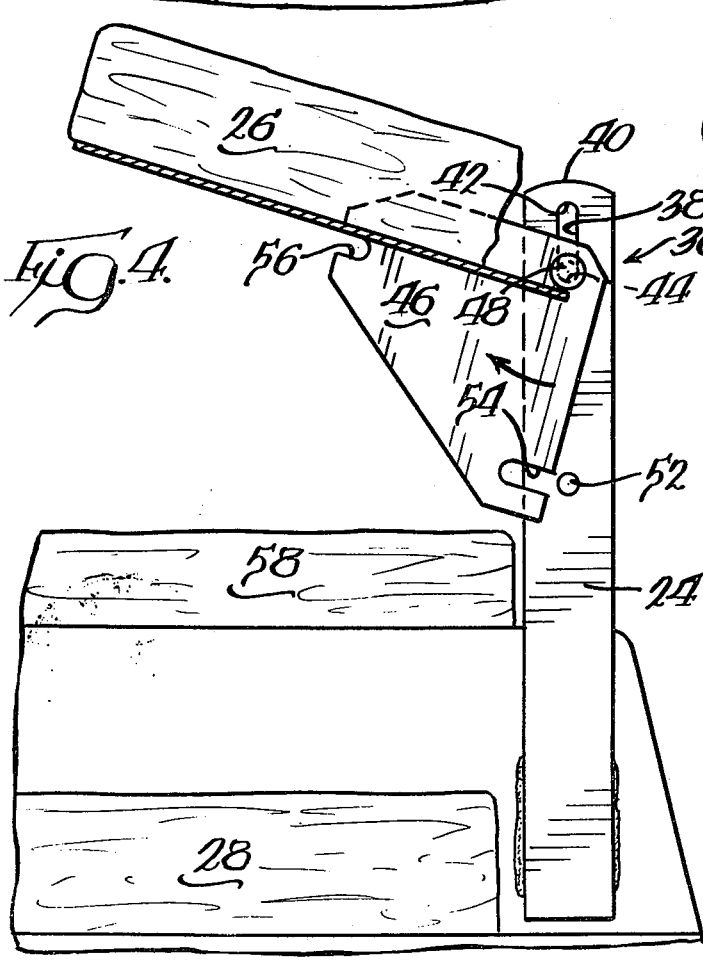
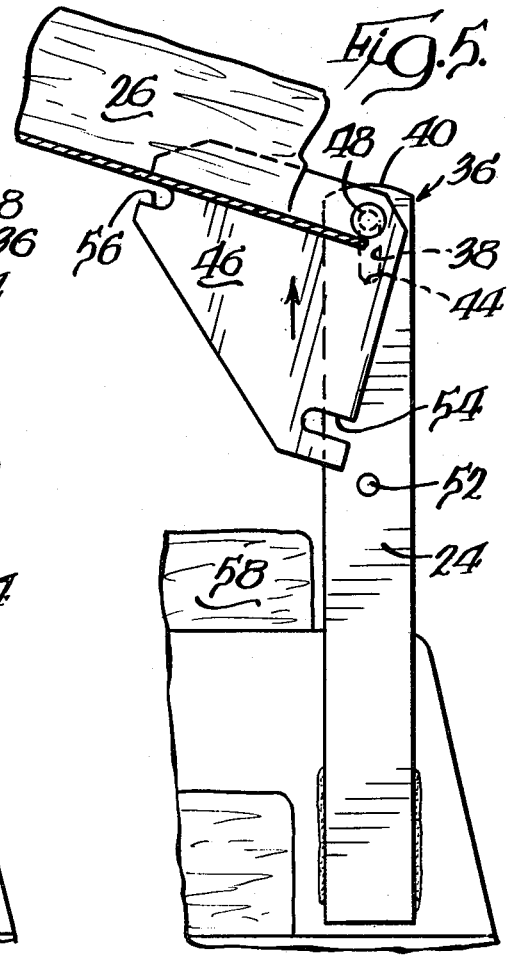

TWO POSITION SEAT ASSEMBLY

TECHNICAL FIELD

This invention relates to seat assemblies and more specifically, to seat assemblies permitting an operator to face in opposite directions to perform different functions.

BACKGROUND OF THE INVENTION

It is common for construction and material handling equipment such as tractors to be provided with implements on both the front and the back of the tractor. Generally, the front of the tractor is provided with a front end loader while the back of the tractor is provided with a backhoe. With such an arrangement it is necessary for the operator to adjust his seat to be able to face in opposite directions depending on which implement is to be used.

Numerous adjustable seats have been disclosed which facilitate seating the operator in two opposite facing positions. Illustrative of such prior devices are U.S. Pat. Nos. 3,243,228 to Watts et al., 3,893,728 to Holopainen, 4,010,977 to Rahman, and 4,252,368 to Miller et al. However, all of these devices are relatively complicated requiring a multitude of parts, and often the seating location on the tractor from front to back depends upon the direction faced. When the operator is facing forward, he is positioned closer to the front of the tractor, than when he is facing backward. This is undesirable where there is a limited amount of space from front to back in the seating area. Many of these devices also do not elevate the operator to a height desired while using the backhoe.

Accordingly, it is desirable to provide a two position seat which avoids these problems of the prior art. The two position seat assembly of the present invention satisfies this desire.

SUMMARY OF THE INVENTION

The two position seat assembly of the present invention is for use on material handling vehicles such as construction equipment and tractors. The two position seat assembly permits an operator to be comfortably seated in a forward position to drive the tractor or operate some front mounted implement such as a front end loader. The seat assembly may also be easily adjusted to permit the operator to be comfortably seated backward while operating a rearward mounted implements such as a backhoe.

The two position seat assembly of the present invention generally comprises a seat support structure including a pair of substantially parallel bars mounted on the vehicle extending upward from the vehicle. Each bar is preferably provided with an elongated slot. A pivot means such as a pair of brackets each having a pin slidably and pivotably received in respective slots is mounted on a seat back section to permit the seat back section to pivot on the bars from a substantially vertical position to a substantially horizontal position.

A locking means such as a peg on each bar cooperates with a recess on each bracket to releasably lock the seat back section in a substantially horizontal position. The seat assembly is preferably provided with a main seat section mounted on the vehicle adjacent the bars with its top surface being substantially horizontal. The brackets are also preferably provided with a second set of recesses which releasably lock the seat back section in a substantially vertical position.

In operation, the seat back section may be located and locked in a substantially vertical position. The operator then sits on the main seat section and uses the seat back section as a back rest. The seat back section may then be pivoted up into the substantially horizontal position with the seat back section located generally in registry above the main seat section. The operator may then sit on the seat back section in this elevated position and easily manipulate controls for a backhoe.

Because the seat back section pivots along its pivot or top side with respect to the bars, the seat back section when in the horizontal position is located directly above and generally in registry with the main seat section. Thus, the operator is seated in the same general area from front to back on the tractor irregardless of which direction he is facing. This eliminates the necessity of having additional space between the forward operated controls and the rearward operated controls to permit the seat to be flipped over from one position to another.

The seat assembly of the present invention also provides the operator with an elevated seat when operating the backhoe so that he can have a clear view of the operation. Unlike much of the prior art, the present invention operates with a minimum amount of parts, providing an inexpensive, reliable and safe seat for the operator.

Numerous other advantages and features of the present invention will become readily apparent from the following detailed description of the invention. The accompanying example, and the appended claims.

BRIEF DESCRIPTION OF THE DRAWINGS

FIG. 1 is a side elevational view of a tractor having a front end loader, a backhoe and a seat assembly in accordance with the present invention;

FIG. 2 is a fragmentary side elevational view showing an operator on the seat assembly of the present invention;

FIG. 3 is an enlarged perspective view taken generally from the rear of the vehicle showing the seat assembly of the present invention comprising a seat back section, pivot means, locking means and elongated upright bars;

FIG. 4 is a fragmentary side elevational view taken substantially along the planes 4—4 of FIG. 3 showing the seat back section being unlocked from its substantially horizontal position;

FIG. 5 is a side elevational view similar to FIG. 4, but showing the seat back section and pivoting means being moved upward to permit the seat back section to be pivoted toward a vertical position;

DESCRIPTION OF THE PREFERRED EMBODIMENT

Figure 6:
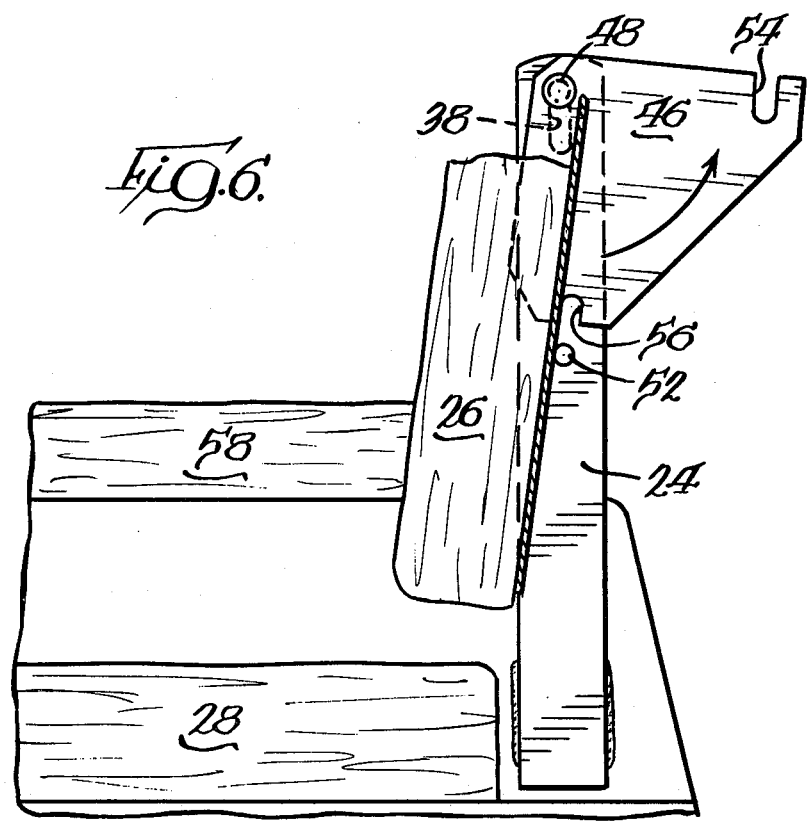
FIG. 6 is a side plan view similar to FIG. 5, but showing the seat back section pivoted downward into a substantially vertical position.

While this invention is susceptible of embodiment in many different forms, there are shown in the drawings and will be described in detail, a preferred embodiment of the invention. It should be understood, however, that the present disclosure is to be considered an exemplification of the principles of the invention and is not intended to limit the invention to the embodiments illustrated.

The precise shapes and sizes of the components are not essential to the invention unless otherwise indicated. For ease of description, the seat assembly of the present invention will be described as normal operating positions and such terms as upper, lower, horizontal, etc., will be used with reference to this position.

A material handling vehicle such as a tractor 10 is shown in FIG. 1 as having a front end loader 12 and a backhoe 14. Mounted on the tractor 10, for use by an operator, is a seat assembly 16 in accordance with the present invention. It will be understood that the seat assembly 16 of the present invention may be used on any material handling vehicle or other situation calling for a reversable seat.

The seat assembly 16 permits an operator to be seated facing the front of the tractor 10 to operate the drive and front end loader controls 18. The seat assembly 16 also permits the operator to be seated facing the back of the tractor 10 in an elevated position. This can best be seen in FIG. 2 where the operator 20 is seated in an elevated position on the seat assembly and is provided with a clear view of the backhoe operation while he manipulates the backhoe controls 22.

Referring to FIGS. 3-5, the two position seat assembly of the present invention generally comprises a seat support structure such as a pair of substantially parallel bars 24 mounted on the tractor 10 and extending upward from the tractor. The bars 24 may be mounted on the tractor 10 by bolting or, as shown in the FIGURES, by welding. A seat back section 26 and preferably a main seat section 28 are then provided. The seat back section has a contact surface 30 and sides, one side being called a pivot or third side 32. Contact surface 30 is used as a back rest when the operator is seated forward and as a seat when the operator is seated rearward. The main seat section 28 also has sides and a top surface 34 with the main seat section mounted on the tractor 10 adjacent the bars 24 with the top surface 34 substantially horizontal.

Pivot means 36 are provided for pivotably mounting the seat back section 26 adjacent its pivot side 32 on the elongated bars 24 substantially free to pivot from a substantially vertical position to a substantially horizontal position. Preferably, the pivot means includes an elongated slot 38 defined by each of the bars and adjacent the uppermost ends 40 of each bar. Each slot 38 has an upper end 42 and a lower end 44. The pivot means 36 also preferably includes two brackets 46 mounted on opposite sides of the seat back section 26 adjacent the pivot side 32. Each bracket is provided with a pin 48 which is slidably and pivotably received in respective slots 38 of the bars 24. Preferably a retaining means such as a washer and cotter pin is mounted on each pin 48 to retain the pins within the slots 38.

The seat assembly 16 of the present invention also includes a locking means associated with the seat back section 26 to releasably lock the seat back section in a substantially horizontal position. Preferably, the locking means includes a peg 52 mounted on one or both bars 24 and preferably extending from the bar toward the opposite bar. The locking means also includes a first recess 54 defined by the bracket 46 and adapted to coact with the peg 52 to releasably lock the seat back section 26 in the horizontal position. Preferably, the bracket 46 also defines a second recess 56 to releasably lock the seat back section 26 in the substantially vertical position. The brackets 46 are adapted to pivot clear of the pegs 52 when the pin 48 is located adjacent the upper end 42 of the slot 38 as the seat back section 26 is lowered or raised to and from the substantially vertical position. Arm rests 58 may also be provided for the comfort of the operation.

Figure 7:
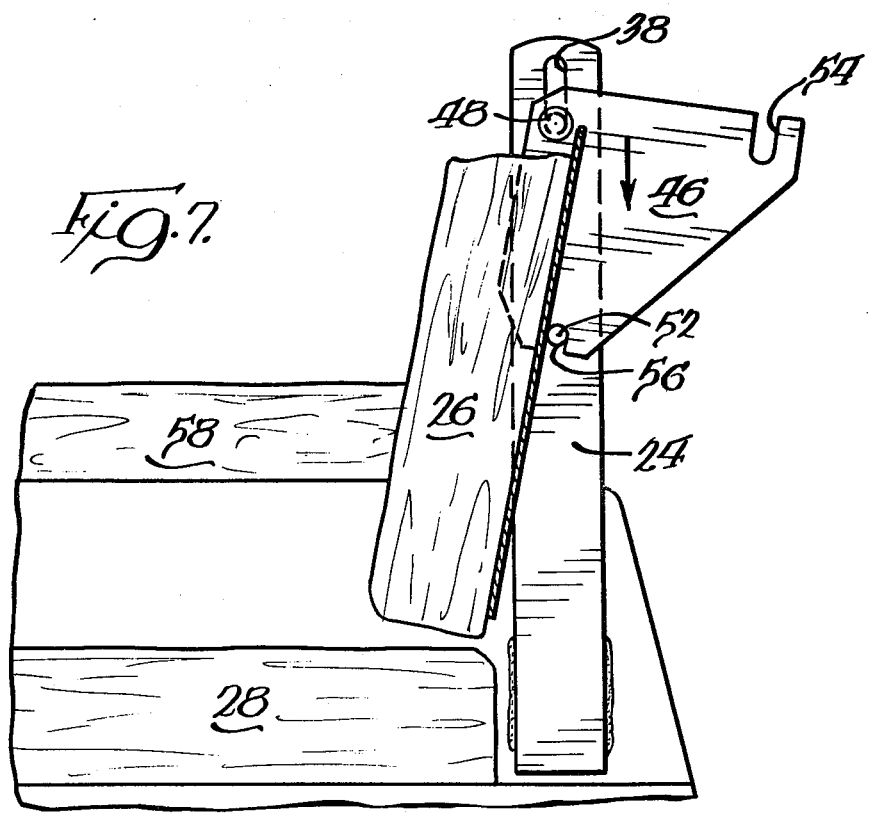
FIG. 7 is a side plan view similar to FIG. 6 but showing the seat back section being locked into its substantially vertical position.

The operation of the seat assembly of the present invention is demonstrated in FIGS. 3-7. As shown in FIG. 3, the seat back section 26 is locked in its horizontal position when the pins 48 are in the lower end 44 of the slots 38 and the pegs 52 are received within the first recesses 54. To place the back seat member 26 in a substantially vertical position, the seat back section is first partially tilted upward as shown in FIG. 4 disengaging the recess 54 from the peg 52. The pins 48 are then slid adjacent the upper end 42 of the slots 58 as shown in FIG. 5. The seat back section 26 may then be pivoted downward with the brackets 46 pivoting free of the peg until the seat back section achieves a substantially vertical position as shown in FIG. 6. The seat back section 26 together with the brackets 46 are then slid downward until peg 52 is received within recess 56 to lock the seat back section in the substantially vertical position as shown in FIG. 7. In this position, the contact surface 30 serves as a backrest for the operator. It will be understood that "vertical position" and "substantially vertical position" include a deviation from vertical to provide a comfortable back rest as in FIG. 7.

The foregoing specification is intended as illustrative and is not to be taken as limiting. Still other variations within the spirit and scope of the invention are possible and will readily present themselves to those skilled in the art.

What is claimed is:

1. A two-position seat assembly for use on a material handling implement, comprising:

a main seat section, having sides and a top surface, mounted on said implement;

a seat support structure comprising a pair of substantially parallel bars mounted on said implement on respective opposite sides of said main seat section generally at the rear thereof, said bars extending generally upwardly from said main seat section and each defining an elongated slot generally at the upper ends thereof, each said elongated slot having upper and lower ends;

a pair of locking pegs respectively mounted on said bars in spaced relation below said elongated slots;

a seat back section having a pair of opposite sides and a contact surface;

a pair of brackets mounted on respective opposite sides of said seat back section generally adjacent a laterally extending third side of the seat back section;

a pair of pivot pin means respectively affixed to said brackets and respectively slidably and pivotably disposed within said elongated slots whereby said seat back section is pivotally mounted on said bars of said support structure, each of said brackets defining at their peripheries first and second outwardly open recesses opening in generally opposite directions, said pivot means pivotally supporting said seat back section for movement by respective disposition of said pivot pin means at the upper ends of said elongated slots so that said brackets are clear of said locking pegs whereby said seat back section is movable from a substantially vertical position, to a horizontal position substantially in registry above said main seat section, said pivot pin means further supporting said seat back section for generally vertical movement by sliding movement of said pivot pin means in said elongated slots, whereby after pivotal movement of said seat back section to said substantially vertical position said seat back section is generally downwardly movable to position said brackets for receiving said locking pegs in respective ones of said first recesses defined by said brackets, and whereby after pivotal movement of said seat back section to said horizontal position, said seat back section is generally downwardly movable so that said second recesses defined by said brackets respectively receive said locking pegs.

* * * * *